United States Patent Office 3,179,559
Patented Apr. 20, 1965

3,179,559
ANTHELMINTIC COMPOSITIONS OF STYRYL-PYRIDINIUM COMPOUNDS AND METHOD OF ADMINISTERING THE SAME
Irwin B. Wood, Hopewell, and Ronald E. Bambury and Harold Berger, Trenton, N.J., assignors to American Cyanamid Company, New York, N.Y., a corporation of Maine
No Drawing. Filed Jan. 26, 1962, Ser. No. 169,085
7 Claims. (Cl. 167—53)

This invention relates to new compositions of matter and methods of administration. More particularly it relates to substituted styrylpyridinium compounds and a carrier, useful in the control and treatment of helminthiases in warm blooded animals.

The losses due to helminth infections in animals total millions of dollars annually. Therefore, an effective anthelmintic composition at a comparatively low cost is highly desirable in the practice of animal husbandry.

The new compositions of the present invention have as the active ingredient styrylpyridinium compounds of the formula:

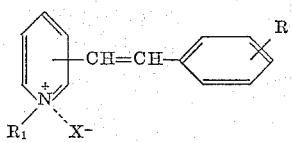

in which R is di-lower-alkylamino group, $R_1$ is lower alkyl and X is an anion. The anions may be, for example, chloride, iodide, bromide, $YOSO_3$ wherein Y is alkyl, etc.

We have found that our new compositions of matter are highly efficacious and posses advantages over currently used anthelmintics. For example, the new compositions of this invention are particularly effective against the migrating larval stages of the swine roundworm, *Ascaris suum,* and thus prevent extensive liver damage and verminous pneumonia and loss of weight in swine. On the other hand, the anthelmintics in commercial use are ineffective against the larval stage of ascarids which cause more morbidity and mortality than the adult stages in swine, particularly in young pigs. When the active ingredients of this invention are given in low level repeated daily doses in feed, they serve as a prophylactic control against helminths such as ascarids and other helminths in warm blooded animals.

The new compositions are highly active when administered in various ways such as in feed stuffs, capsules, by drench and various pharmaceutical forms hereinafter described.

The active component of the new compositions can be present in amounts from 10 mg. to 40 g., however, the preferred range is from about 20 mg. to 30 g., in an edible carrier depending upon the animal to be treated and the mode of administration. When the edible carrier is animal feed, the active ingredient should not exceed 0.2% of the total daily ration. The compositions can also contain various pharmaceutical carriers which may be, for example, non-toxic liquid solvents, gums, cellulose gums, processed proteins such as soy and peanut, various cereals such as wheat germ, rice flour, potato flour, corn and feed stuff per se.

We have found that long term continuous administration in the feed of livestock or farm animals is often desirable for keeping worm infections under control and to act as a prophylactic measure in keeping animals in good condition. For example, 1-methyl-2-(p-dimethylaminostyryl) pyridinium iodide at 25 mg./kg. body weight per day for 15 days was one hundred percent effective in preventing the development of the characteristic liver damage normally caused by migrating larvae of *Ascaris suum.* This compound was thoroughly mixed in the daily ration in an amount equivalent to about 0.02% of the daily ration.

*Example 1*

To 47 g. of 1,2-dimethylpyridinium iodide in 200 ml. of ethanol is added 29.8 g. of p-dimethylaminobenzaldehyde and 2 ml. of piperidine. The mixture is refluxed for 2 hours and the precipitate filtered. Evaporation of the mother liquor gives an additional crop of solids bringing the total yield of 1-methyl-2-(p-dimethylaminostyryl)-pyridinium iodide to 46 g., melting point 272–273° C.

In a similar manner other 1-alkyl-α-picolinium salts may be condensed with p-dialkylaminobenzaldehyde to give 1-alkyl-2-(p-dialkylaminostyryl)-pyridinium salts as described by A. P. Phillips, J. Org. Chem., 12, 333 (1947).

We claim:
1. A therapeutic composition for the elimination of helminths in economically useful warm blooded animals comprising a styrylpyridinium compound having the formula:

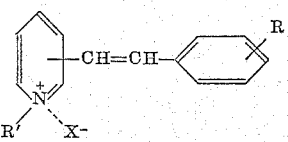

in which R is di-lower-alkylamino, R' is lower alkyl and X is an anion selected from the group consisting of chloride, iodide, bromide, and lower alkyl-$OSO_3$ in an edible carrier wherein the drug is present in from an anthelmintically effective amount to 0.2% of the total daily intake.

2. A therapeutic composition in accordance with claim 1 wherein the edible carrier is swine feed stuff.

3. A thereapeutic composition useful in the elimination of roundworms in swine comprising 1-methyl-2-(p-dimethylaminostyryl)-pyridinium iodide in an edible carrier wherein the drug is present in from an anthelmintically effective amount to 0.2% of total daily intake.

4. A method useful in eliminating helminths in warm blooded animals which comprises orally administering in dosage form to animals with helminth infections 10 mg. to 40 g. of a styrylpyridinium compound having the formula:

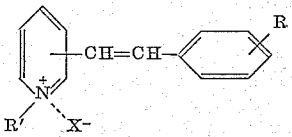

in which R is di-lower-alkylamino, R' is lower alkyl and X is an anion selected from the group consisting of chloride, iodide, bromide and lower alkyl-$OSO_3$, and an edible carrier.

5. A method according to claim 4 in which the edible carrier is feed stuff.

6. A method according to claim 5 in which the styrylpyridinium compound is 1-methyl-2-(p-dimethylaminostyryl) pyridinium iodide.

7. A method of treating and eliminating roundworms in swine which comprises administering orally to roundworm infected swine a composition of 1-methyl-2-(p-dimethylaminostyryl) pyridinium iodide and swine sustenance wherein the drug is present in from an anthelmintically effective amount to 0.2% of the total daily swine ration.

References Cited in the file of this patent

Bahner: Proc. Soc. Exptl. Biol. and Med., vol. 90, 1955, pages 133–135.